April 4, 1939.  S. MARTIN, JR  2,153,382
ZONE HEATING SYSTEM
Filed June 22, 1935
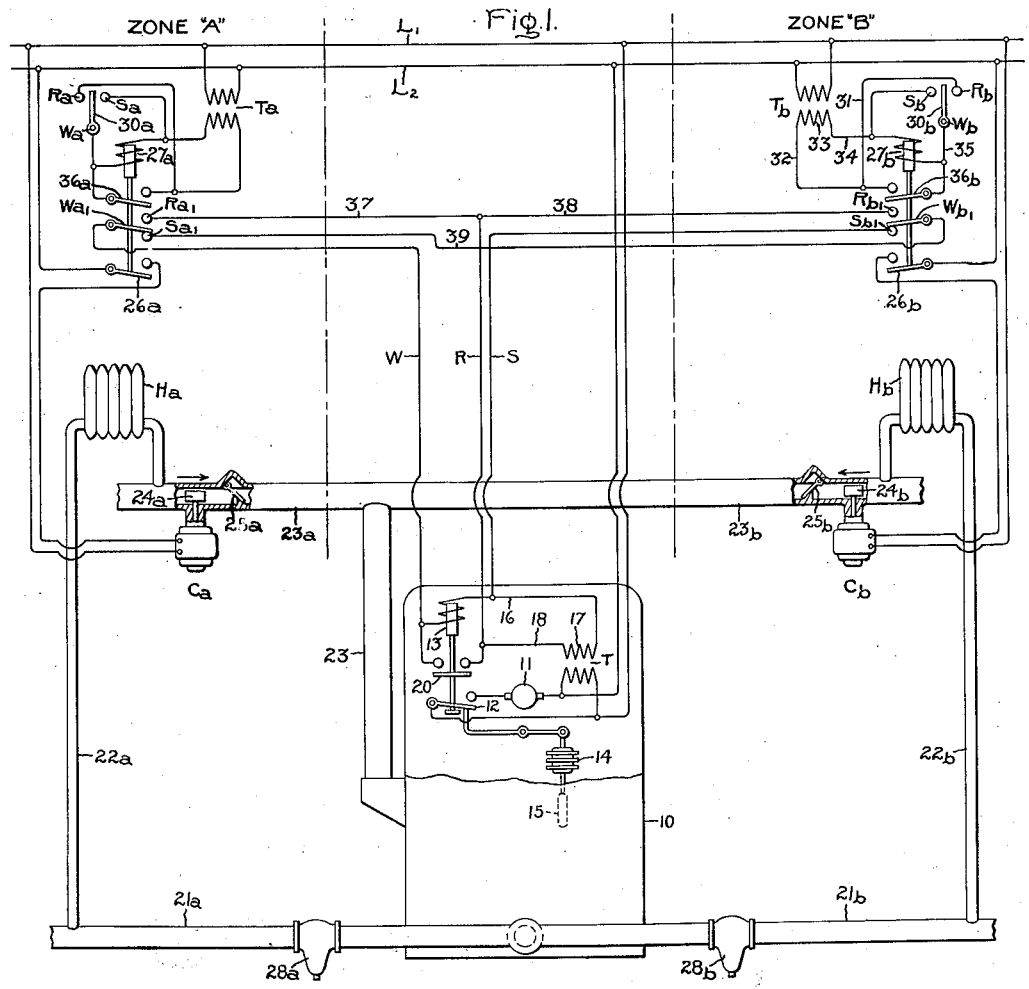
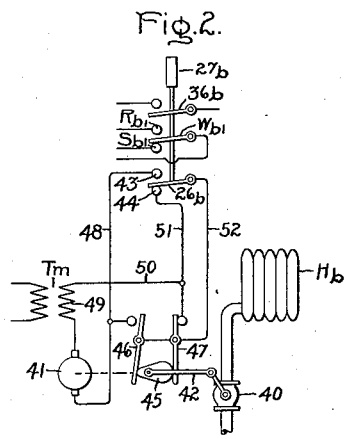
Inventor:
Samuel Martin Jr.,
by Harry E. Dunham
His Attorney.

Patented Apr. 4, 1939

2,153,382

UNITED STATES PATENT OFFICE 2,153,382

ZONE HEATING SYSTEM

Samuel Martin, Jr., Verona, N. J., assignor to General Electric Company, a corporation of New York Application June 22, 1935, Serial No. 27,900

4 Claims. (Cl. 236—1)

This invention relates to heating systems and particularly to an improved system and apparatus for maintaining predetermined temperature conditions in each of a plurality of zones which are supplied with heat from a single heating plant. The improvements of the present invention may be used with advantage in any zone heating system employing a heat exchange medium such as steam, vapor, hot water, hot air or the like.

In multiple zone heating systems, such as those for apartment houses, office buildings or the like, it is often found to be desirable from an economic standpoint to supply heat to a plurality of rooms, apartments or like separate zones from a single heating apparatus. Such systems require, for the convenience of the occupants of each of the different zones, that there be provided for each zone thermal responsive control means subject to individual adjustment and capable of maintaining predetermined temperature conditions in the respective zones. For the accomplishment of this purpose the heating system must be installed in such a manner that the proper amount of heat is supplied to each zone at any time that the temperature therein falls below the desired limit and without regard to the temperature conditions of any of the other zones, and also in such manner that no heat is supplied to any zone which is above its minimum desired temperature limit even though others of the zones are calling for heat.

It is accordingly a principal object of the present invention to provide a heating system wherein a call for heat by any one of the zones results in initiation of the operation of a corresponding heat distributing means and the common heat generating apparatus to supply heat to that zone, while subsequent satisfaction of the heat requirements of that zone results only in the stopping of the corresponding heat distributing means, the heat generating apparatus being rendered inoperative only upon satisfaction of the heat requirements of all of the zones. The invention also includes the provision of means for preventing the distribution of heat to any zone the heat requirements of which are satisfied even though heat is being supplied to other zones which are unsatisfied.

Of the various embodiments of which the invention is capable, those herein illustrated and described have been selected as best serving to insure a full and clear understanding of the invention and the principles underlying the same in order that one skilled in the art may perceive other applications to which the improved apparatus is suited and may properly adapt the apparatus to various conditions presented in operation. The details of the manner in which the invention is carried out will become evident from the following description taken in conjunction with the accompanying drawing in which Fig. 1 illustrates diagrammatically an embodiment of the invention as applied to a hot water circulating heating system, and Fig. 2 illustrates diagrammatically a modification of the invention which is suitable for either steam or hot water heating systems.

Referring to Fig. 1, numeral 10 designates any suitable form of heat generator, which, though the invention is not necessarily limited thereto, is preferably an oil-fired boiler furnace of the improved type disclosed in United States Letters Patent of H. S. Woodruff, No. 1,992,794, granted February 26, 1935, and assigned to the assignee of the present invention.

As diagrammatically illustrated, the heat generator or boiler furnace 10 is provided with an automatic electric motor driven oil burner mechanism 11 which preferably is of the improved type disclosed and claimed in the copending application of W. O. Lum, Serial No. 737,063, filed July 26, 1934, and assigned to the assignee of the present invention, although it is to be understood that any other suitable form of burner mechanism may be employed if desired. The details of the construction and operation of the oil burner mechanism referred to do not form a part of the present invention and it is therefore believed sufficient to point out that the mechanism when energized automatically establishes combustion in the boiler furnace and when de-energized automatically stops the combustion. As illustrated the oil burner mechanism 11 is energized from electrical supply lines $L_1$ and $L_2$ when the switch 12 is closed. Switch 12 is under the joint control of the operating electromagnet 13 and the boiler thermostat or aquastat 14, each of which is capable of controlling the operation of the switch into its closed position independently of the other.

Aquastat 14 is illustrated as of the expansible bellows type having its bulb 15 immersed in the water of the boiler furnace so as to be responsive to the temperature thereof. The function of the aquastat is to control, independently of electromagnet 13, the starting and stopping of the oil burner mechanism to maintain the boiler water above a predetermined temperature.

As will be seen from the drawing, electromagnet 13 is energized from electrical supply lines L1 and L2 or any other suitable source, through transformer T when a circuit is completed between the control conductors W and R. Such a circuit may be traced as extending from conductor W through the winding of electromagnet 13, conductor 16, secondary 17 of transformer T, conductors 18 and R and a suitable connection between conductors R and W which will be described in detail hereinafter. Upward movement of the plunger of electromagnet 13 results in closure of the switch 12 and also closure of switch 20 which establishes a holding circuit for the electromagnet to prevent chattering of the switch contacts. This holding circuit extends from secondary 17 of transformer T through conductor 18, switch 20, a portion of conductor W, the winding of electromagnet 13 and conductor 16 back to secondary 17. On the other hand, the completion of a circuit between the conductors W and S establishes, as is obvious from the drawing, a short circuit around the winding of the electromagnet 13 with resultant deenergization thereof and opening of the oil burner mechanism control switch 12 and holding circuit switch 20. A preferred automatic oil burner control of the above described three-wire type, having a run circuit connection R, a stop circuit connection S and an intermediate circuit connection W, is described in detail in the copending application of John Eaton, Serial No. 735,103, filed July 14, 1934 and assigned to the assignee of the present invention. However, it is to be understood that the present invention is not limited in this respect and that any suitable type of oil burner control including a two-wire type may also be used.

The zones A and B are provided respectively with separate heating devices which, as illustrated in conjunction with the hot water circulating system, comprise radiators $H_a$ and $H_b$. Distribution means connected in parallel relation to each other are provided for supplying heated water to the radiators from the boiler furnace 10 and comprise supply mains $21_a$ and $21_b$, branch pipes $22_a$ and $22_b$, individual return mains $23_a$ and $23_b$ and common return main 23. Incorporated in each of the distribution means is a water circulating or pumping unit, these units being designated respectively on the drawing as $C_a$ and $C_b$.

Circulator $C_a$ has an electric motor driven impeller $24_a$ which is arranged to rotate in a manner to produce flow of hot water in return main $23_a$ in the direction indicated by the arrow. The pressure created in the main $23_a$ by the circulator is sufficient to open the check valve $25_a$ to permit flow of water in the proper direction. Upon stopping of the circulator, the check valve operates automatically to prevent flow of hot water in the reverse direction. Circulator $C_b$ is similarly provided with an electric motor driven impeller $24_b$ and a check valve $25_b$. Circulators $C_a$ and $C_b$ and the check valves $25_a$ and $25_b$ are so arranged in the mains $23_a$ and $23_b$ respectively as to produce flow of the hot water in the mains $23_a$ and $23_b$ in opposite directions towards the common return main 23. Connections are provided for the energization of the electric motors of the circulators $C_a$ and $C_b$ from electrical supply lines L1 and L2 upon closure of the switches $26_a$ and $26_b$ respectively of the electromagnetic control switches $27_a$ and $27_b$ respectively.

As a further means for preventing circulation of the heat exchange medium through either of the radiators $H_a$ or $H_b$ when their corresponding circulators, $C_a$ and $C_b$ respectively, are not in operation, traps $28_a$ and $28_b$ are provided in the supply mains $21_a$ and $21_b$ respectively for the prevention of one pipe circulation.

In each of the zones A and B is a thermostatic control device, designated respectively as $30_a$ and $30_b$, which devices are set to maintain predetermined temperatures in their corresponding zones. The operation of the thermal control for either zone will be understood from a description of the operation of the control for one of the zones, namely zone B. Upon a decrease in the temperature in zone B below the predetermined desired limit, the blade of the thermostatic device $30_b$ moves into engagement with its "run" contact $R_b$ and thereby effects energization of the winding of control electromagnet $27_b$ from the secondary of transformer $T_b$, the primary of which is connected across the electrical supply lines L1 and L2. The energizing circuit extends from contact $R_b$ through conductors 31 and 32, secondary 33 of transformer $T_b$, conductor 34, the winding of electromagnet $27_b$, conductor 35 and terminal $W_b$ to the blade of thermostatic device $30_b$. Energization of the electromagnet results in closure of switch $36_b$ to establish a holding circuit for the electromagnet, this circuit extending from secondary 33 through conductor 34, the winding of electromagnet $27_b$, conductor 35, switch $36_b$, and conductor 32 back to secondary 33. At the same time switch $26_b$ is closed to energize the impeller driving motor of circulator $C_b$, and switch arm $W_{b1}$ is moved from engagement with contact $S_{b1}$ into engagement with contact $R_{b1}$. Deenergization of electromagnet $27_b$ occurs upon an increase in the temperature of zone B above its predetermined value when the blade of thermostat $30_b$ engages its "stop" contact $S_b$ throwing a short circuit around the winding of the electromagnet.

As will be seen by the drawing, both the contacts $R_{a1}$ and $R_{b1}$ are connected to the control conductor R of the oil burner mechanism by means of conductors 37 and 38 respectively. Contact $S_{a1}$ is cross connected to switch member $W_{b1}$ by means of conductor 39, while switch member $W_{a1}$ is directly connected to the control conductor W and contact $S_{b1}$ is directly connected to control conductor S. By this arrangement of connections either engagement of switch member $W_{a1}$ with contact $R_{a1}$ or engagement of switch member $W_{b1}$ with contact $R_{b1}$ suffices to complete the circuit between control conductors W and R to thereby energize control electromagnet 13 and effect starting of the oil burner mechanism 11 as previously described. On the other hand, the cross connection between contact $S_{a1}$ and switch member $W_{b1}$ requires engagement of both the switch members $W_{a1}$ and $W_{b1}$ with their respectively cooperating contacts $S_{a1}$ and $S_{b1}$ in order to complete the circuit between control conductors R and S to thereby deenergize control electromagnet 13 and effect stopping of the oil burner mechanism 11 as previously described. It will be apparent that the same result may be accomplished by a cross connection between contact $S_{b1}$ and switch element $W_{a1}$ where contact element $W_{b1}$ is connected to control conductor W and contact $S_{a1}$ is connected to control conductor S.

Control of the circulation of the heat exchange medium in the system may be accomplished in different ways in accordance with the type of medium used in the system. The circulators $C_a$ and $C_b$ illustrated in Fig. 1 are particularly adapted for use in a hot water circulation system. It will be evident that the circulators may be replaced by some form of automatically controlled valve mechanism such as a solenoid operated valve or a motor operated valve of the type diagrammatically illustrated in Fig. 2 and designated by the numeral 40. It will of course be understood that in a steam heating system the circulators are unsuitable and some form of valve mechanism must be used.

In Fig. 2 are illustrated the connections for controlling the operation of motor operated valve 40 for controlling the flow of heat exchange medium to the radiator $H_b$. However, it is to be understood that the same type of valve would also be used to control the circulation of heat exchange medium to the radiator $H_a$ under the control of electromagnet $27_a$ and switch $26_a$. The valve 40 is connected to be operated by means of the motor 41 through the agency of the crank arm 42, and motor 41 is connected to be energized from transformer $T_m$, which may be connected to any suitable source of electrical current such as electric supply lines $L_1$ and $L_2$, under the control of switch $26_b$. Energization and deenergization of motor 41 to open and close the valve 40 are effected by means of switch element $26_b$ with its cooperating contacts 43 and 44 in conjunction with the limit switch mechanism comprising cam 45 and movable switch members 46 and 47. Closure of switch member $26_b$ on contact 43 completes a circuit from contact 43 through conductor 48, motor 41, secondary 49 of transformer $T_m$, conductors 50 and 51, limit switch 47 and conductor 52 to switch member $26_b$. Motor 41 thereupon operates to open valve 40 by means of crank arm connection 42 while at the same time cam 45 is rotated. At the time that valve 40 is in fully open position, the cam 45 has rotated 180° to open limit switch 47 and close limit switch 46, thereby deenergizing motor 41. Upon subsequent movement of switch member $26_b$ from contact 43 back to contact 44 by operation of electromagnet $27_b$, a circuit is established from contact 44 through conductors 51 and 50, secondary 49, motor 41, conductor 48, limit switch 46 and conductor 52 to switch member $26_b$, thereby energizing motor 41 to close valve 40. Cam 45 rotates 180° opening limit switch 46 to deenergize motor 41 and closing limit switch 47 preparatory to the next closure of switch member $26_b$ upon contact 43. It will be understood that other well known forms of electrically controlled valves may be employed, if desired.

The operation of the control and distribution means for supplying heat exchange medium to the radiators $H_a$ and $H_b$ upon a call for heat in the zones A and B is substantially the same for both of the zones. Hence the operation of only one of the branch systems, that for zone B, will be described in detail. A decrease in the temperature in zone B below the value for which the thermostatic switch $30_b$ is set causes the blade of the thermostat to engage with its "run" contact $R_b$. This energizes the winding of electromagnetic control switch $27_b$ in the manner previously described and the control switch thereupon operates to effect closure of switch $26_b$. In the case of the hot water circulating system, this completes the circuit for effecting operation of the driving motor of the circulator $C_b$. Impeller $24_b$ of the circulator $C_b$ pumps heated water from the boiler furnace 10 through the supply main $21_b$, trap $28_b$, branch pipe $22_b$ and radiator $H_b$ from whence it is caused to flow in the direction indicated by the arrow through the check valve $25_b$ into return main $23_b$. The check valve $25_a$ in return main $23_a$ acts to prevent the flow of water in the main $23_a$ under the force of the circulator $C_b$ and therefore the water from main $23_b$ is forced to flow back into the boiler furnace through the common return main 23.

Concurrently with the closure of switch $26_b$ the switch element $W_{b1}$ is moved from engagement with contact $S_{b1}$ into engagement with contact $R_{b1}$ thereby completing the circuit between control conductors R and W to energize the electromagnetic control switch 13 and start the burner mechanism 11 as previously described. In operation, the aquastat 14 functions at all times to control the oil burner mechanism in a manner to maintain the boiler water above a predetermined temperature. The operation of the burner mechanism under the control of the zone thermostats serves to supply to the circulated water the additional heat required by reason of the loss of heat in the system incident to the heating of the zones and other radiation.

It will, of course, be evident that the effect of the closure of switch member $W_{b1}$ upon contact $R_{b1}$ depends upon the conditions within zone A. If zone A is calling for heat at the same time and its corresponding electromagnetic control switch $27_a$ has operated previously to effect starting of the burner mechanism, then switch member $W_{a1}$ is already in engagement with $R_{a1}$. Under these conditions the closure of switch member $W_{b1}$ upon contact $R_{b1}$ has no effect upon the operation of the oil burner mechanism. In other words, either one of the thermostatic control devices is individually capable of effecting starting of the oil burner mechanism provided the other thermostatic control has not already produced such operation.

When subsequently the temperature in the zone B is brought up to the value for which the thermostat $30_b$ is set, the blade of the thermostat moves from engagement with "run" contact $R_b$ into engagement with "stop" contact $S_b$ and thereby completes a circuit for effecting deenergization of the electromagnetic switch $27_b$ as previously described. This results in deenergization of electromagnetic control switch 13, thereby stopping the burner mechanism 11 provided zone A is not at the same time calling for heat. If, at the time that thermostat $30_b$ is satisfied, with resultant deenergization of electromagnet $27_b$, the temperature in the zone A is below the desired minimum value so that thermostat $30_a$ is calling for heat and electromagnet $27_a$ has operated to disengage switch element $W_{a1}$ from contact $S_{a1}$, then the circuit from control conductor W to control conductor S is broken at switch $W_{a1}$ and the closure of switch element $W_{b1}$ upon contact $S_{b1}$ is ineffective to produce deenergization of the oil burner mechanism. In any case, deenergization of electromagnet $27_b$ results in opening switch $26_b$ so that circulator $C_b$ stops and further circulation of hot water in the heating system for the zone B is prevented by means of trap $24_b$ and check valve $25_b$.

If the modification illustrated in Fig. 2 is employed in the heating system, the control of the oil burner mechanism by means of the thermostats $30_a$ and $30_b$ is the same as that previously described in detail in connection with the operation of the control illustrated in Fig. 1. Furthermore, switch members $26_a$ and $26_b$ are operated in the same manner by electromagnets $27_a$ and 27b. However, in the case of the modification, operation of switch members 26a and 26b is effective in controlling motor operated valves such as the one designated by the numeral 40. From the previous description with relation to Fig. 2 it will be understood that a call for heat by the zone thermostat results in opening of the motor operated valve and also establishment of the proper connections for starting the burner mechanism. Subsequent satisfaction of the zone thermostat results in closing of the corresponding motor operated valve to prevent further circulation of heat exchange medium to the satisfied zone, while the burner mechanism is concurrently deenergized only if the other zone thermostat is also satisfied. Hence it will be seen that the control of the circulator motor in the one case and the control of the motor operated valve in the other case are accomplished in substantially the same way and, in effect, independently of the control of the oil burner mechanism.

From the foregoing description it will be understood that the thermostats 30a and 30b and their cooperating electromagnetic switches 27a and 27b are so interconnected that both thermostats must be in engagement with their cooperating "stop" contacts Sa and Sb respectively in order to complete the short circuit for deenergizing the winding of the electromagnet control switch 13 of the burner mechanism 11. However, with either thermostat in its "stop" position, that is, in engagement with its cooperating S contact, the other thermostat can engage with its cooperating "run" contact, that is, R contact, to energize the master electromagnetic control switch 13 and thereby effect operation of the oil burner mechanism to heat the heat exchange medium. Hence this connection arrangement insures that the ambient temperatures of both of the zones A and B must be above the values which their respective thermostats are set to maintain before the oil burner mechanism is stopped, but the thermostat of either zone can start the oil burner mechanism when the ambient temperature of its corresponding zone falls below the predetermined value. On the other hand, both the starting and the stopping of the circulators, in the case of hot water systems, and the motor operated valves, in the case of steam systems, are under the individual and independent control of the thermostats of the corresponding zones. In case the thermostat of one zone calls for heat during the time that the common heat generating apparatus and the individually corresponding heat distribution equipment are in operation to supply heat to the other zone, as occurs most frequently in severe heating service, heat exchange medium is immediately available for circulation to the first mentioned zone. Furthermore, the aquastat 14 provides an additional insurance that heat exchange medium of a predetermined minimum temperature is at all times available in the system.

What I claim as new and desire to secure by Letters Patent in the United States is:

1. In a multiple zone heating system, the combination of a single automatically operable oil-fired hot water boiler furnace, a plurality of fluid conduit systems each connected for conveying heated water from the boiler furnace to a separate one of a plurality of zones and for returning the water to the boiler furnace, a plurality of electric motor driven impeller means each operatively associated with a separate one of said conduit systems for creating a circulation of heated water therethrough, control means including an electro-magnetic switch having a single actuating winding and a pair of switch members movable thereby, said winding being adapted to be energized for initiating operation of said apparatus and establishing a holding circuit for itself through operation of said switch members for starting and stopping the operation of said boiler furnace, a plurality of electric switching means each individually operable for energizing and deenergizing a separate one of said motor driven impeller means and for individually closing an energizing circuit for said winding to start operation of said boiler furnace and establishing a holding circuit for said winding, a circuit adapted to be closed by joint operation of all said thermostatic devices for short circuiting said actuating winding to open said holding circuit and to terminate operation of said boiler furnace, thermostatic means connected with one of said pair of switch members and operative responsively to the temperature of the water in said boiler furnace for effecting operation of the furnace to maintain the temperature of the boiler water above a predetermined limit, and a plurality of other thermostatic means each responsive to the temperature of a separate one of said zones and each connected for controlling the operation of the one of said switching means which controls the circulation of water to the corresponding zone.

2. A dual zone heating system including in combination a separate thermostat in each zone operable in response to variations of the temperature therein from a predetermined value, an automatic heating means operable to vary the temperature of a heat transfer medium, thermostatic means responsive to the temperature of said medium for controlling the operation of said heating means to maintain said medium above a predetermined minimum temperature, a pair of heat transfer medium control means, each independently operable under the control of a corresponding one of said thermostats for controlling the distribution of the heat transfer medium to the corresponding zone to maintain the temperature therein at said predetermined value, and electroresponsive means having an actuating winding connected to be energized upon operation of either one of said thermostats in response to a variation in the temperature of the corresponding zone below the predetermined value therefor for controlling said automatic heating means to raise the temperature of the heat transfer medium above said predetermined minimum value independently of the control of said thermostatic means, and connected to be jointly controlled by both said thermostats to control said heating means to decrease the temperature of the heat transfer medium to said predetermined minimum value only when the temperature in each zone is above the predetermined value therefor.

3. A dual zone heating system including in combination, a separate thermostat in each zone operable in response to variations in the temperature thereof from a predetermined value, an automatic heating means operable to vary the temperature of a heat transfer medium, a thermostat responsive to the temperature of the heat transfer medium for controlling said automatic heating means to maintain the medium above a predetermined minimum temperature, a pair of heat transfer control means, each independently operable under the control of a corresponding one of said thermostats for controlling the distribution of the heat transfer medium to the corresponding zone to maintain the temperature therein at said predetermined value, and electro-responsive means having an actuating winding connected to be energized by each of said thermostats when the temperature in the corresponding zone thereof decreases below the predetermined value thereof for controlling said heating means to increase the temperature of the heat transfer medium above said predetermined minimum value independently of the control of said thermostat and connected to be jointly controlled by said thermostat to control operation of the heating means to decrease the temperature of the heating medium to said predetermined minimum value only when the temperature in each zone is above the predetermined values therefor.

4. A multiple zone heating system including in combination a boiler connected for supplying heated medium to a plurality of zones and having automatically operable heat generating apparatus for heating the medium, thermostatic means responsive to the temperature of said medium for controlling the operation of said heat generating apparatus to maintain the medium in the boiler above a predetermined minimum temperature, separate control means including an electromagnetic switch having a winding adapted to be energized for initiating operation of said heat generating apparatus independently of the control of said thermostatic means and provided with connections for establishing a holding circuit for said winding upon energization thereof, a plurality of circulating means each respectively operable for circulating medium from said boiler to a separate one of said zones, a plurality of thermostatic devices each responsive to temperature in a separate one of said zones and each operatively connected for individually starting and stopping a corresponding circulating means and for individually closing an energizing circuit for said winding to initiate operation of said heat generating apparatus, and a circuit adapted to be closed by the joint operation of all of said thermostatic devices upon the stopping of operation of all of said circulating means for short circuiting said actuating winding to effect the opening of said holding circuit and return the operation of said heat generating apparatus under the control of said thermostatic means.

SAMUEL MARTIN, Jr.